J. L. MAHONEY.
APPARATUS FOR MAKING WATER BAGS.
APPLICATION FILED JUNE 14, 1911.
1,035,616.
Patented Aug. 13, 1912.
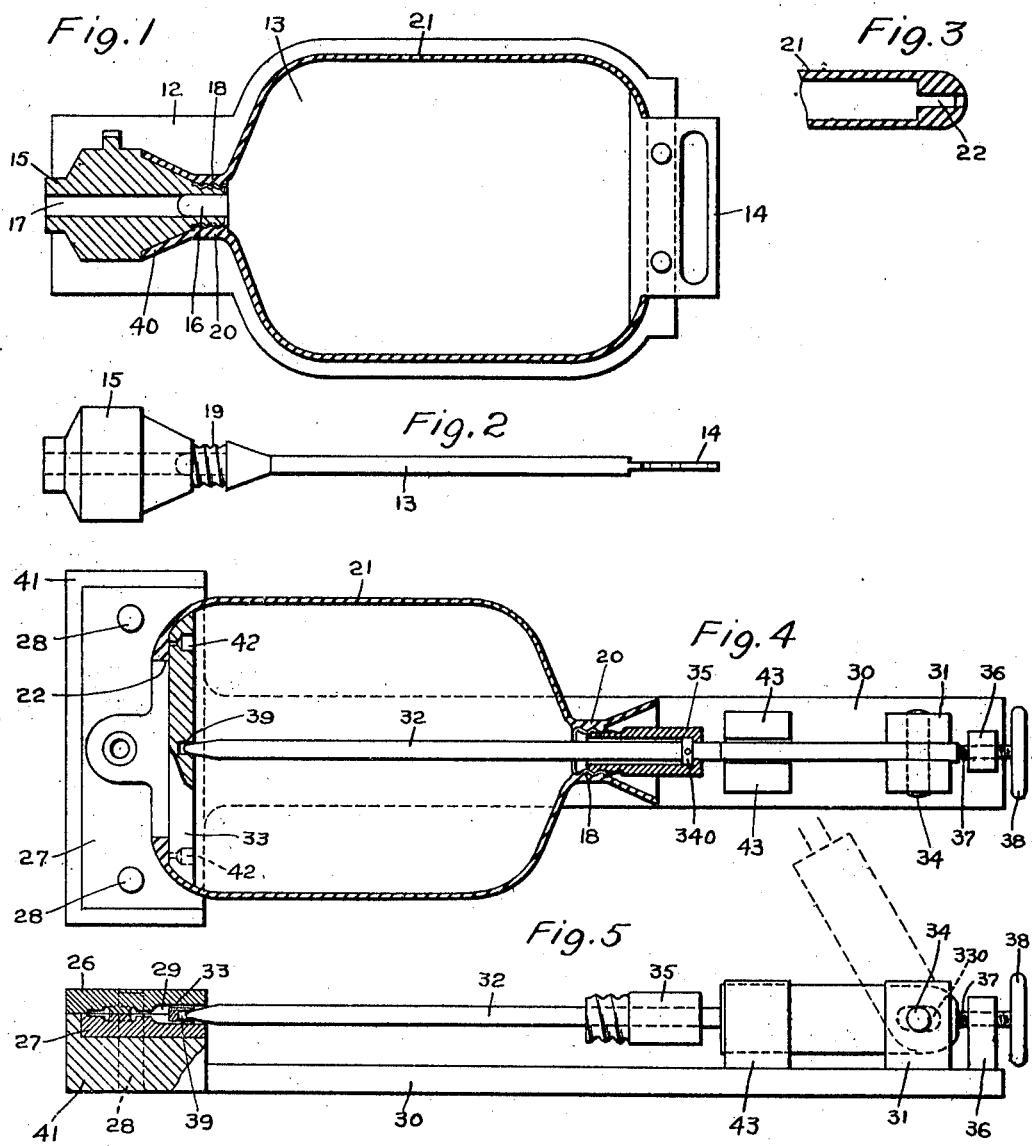
WITNESSES:
INVENTOR
Jeremiah L. Mahoney
BY
ATTORNEY

UNITED STATES PATENT OFFICE.

JEREMIAH L. MAHONEY, OF NEW HAVEN, CONNECTICUT, ASSIGNOR OF ONE-HALF TO JAMES A. MURRAY, OF NEW HAVEN, CONNECTICUT.

APPARATUS FOR MAKING WATER-BAGS.

1,035,616.  Specification of Letters Patent.  Patented Aug. 13, 1912.

Application filed June 14, 1911. Serial No. 633,181.

*To all whom it may concern:*

Be it known that I, JEREMIAH L. MAHONEY, a citizen of the United States, residing at New Haven, county of New Haven, State of Connecticut, have invented an Improvement in Apparatus for Making Water-Bags, of which the following is a specification.

This invention relates to apparatus for closing openings in hollow plastic articles, the same being designed more particularly for use in the manufacture of rubber hot water bottles or bags, although capable of adaptation for use in connection with the manufacture of other articles of a similar nature.

In accordance with one method of manufacturing rubber water bottles and the like, as heretofore practised, these articles are formed by vulcanizing the same upon a core or mandrel in a mold. In order to provide for properly supporting said core or mandrel in said mold and in order that the same may be removed after the process of vulcanization has been completed it is necessary to leave an opening in the wall of the bottle. Such openings are usually closed by cement or by mechanical means, such as a gromet. Such cemented or mechanically closed joints or seams present lines of weakness in the finished article resulting in leakage and impairing the durability of the bottle whose strength depends upon the strength of the cement or of the mechanical fastening, and are furthermore clumsy and unsightly in appearance.

In another application filed herewith, Serial No. 633,182, I have described a bottle of the character referred to which is seamless and unitary throughout and have further described a method whereby the opening in the wall of the bottle left by the core or mandrel in the usual process of manufacture is closed by vulcanization, thereby producing the seamless bottle or bag referred to.

It is an object of the present invention to provide an improved apparatus by which the above result can be effectually accomplished. This and other objects of the invention, together with means whereby the same may be carried into effect, will best be understood from the following description of one form or embodiment thereof illustrated in the accompanying drawing. It will be understood, however, that the construction described and shown has been chosen for illustrative purposes merely and that the invention may be embodied in other forms without departing from the spirit and scope thereof.

In said drawing: Figure 1 is a plan view of one part of a mold in which the body portion of a water bottle is originally formed, the core or mandrel being shown in place therein, and a portion of said core together with the bottle itself being shown in section. Fig. 2 is a side elevation of the core or mandrel. Fig. 3 is a detail sectional view at right angles to Fig. 1 showing the open bottom of the bottle. Fig. 4 is a plan view, partly in section, of the apparatus for sealing or closing the bottom of the bottle. Fig. 5 is a side elevation, partly in vertical section, of the apparatus shown in Fig. 4.

Referring to the drawings, and particularly to Figs. 1 to 3, 12 denotes one of the usual mold members which collectively provide a molding cavity of the form and size of the exterior surface of the bottle including a body portion 21, a reduced neck 20 and a flaring mouth 40. 13 denotes the core or mandrel having at one end an extension 14 which is received between and positioned by the mold member 12 and at the other end a preferably detachable head 15 similarly held and positioned by the mold members. The body portion of the core 13 as shown is connected to the head 15 at a point corresponding to the neck 20 of the bottle by a pin 16 projecting from said body portion and entering a bore 17 in said head 15. 19 denotes a threaded stem on the head 15 adapted to hold the usual threaded thimble 18 in such a position that the latter will be embedded in the neck 20 of the bottle in the molding process.

The operation of forming the bottle or bag by means of the apparatus just described will, it is thought, be clear to those skilled in the art without further explanation. After vulcanization of the bottle the two parts of the mold are separated, the bottle removed and the core 13 withdrawn by means of its extension 14 through the opening 22 left in the bottom of said bottle by said extension. The loose connection between the pin 16 and the bore 17 in the head permits the latter to be withdrawn in the opposite direction by disengaging its neck 19 from the thimble 18.

In place of the apparatus above described for molding the rubber bottle or bag upon its core any other suitable or equivalent apparatus may be employed. The apparatus forming the subject of the present invention has to do with the closing or sealing of the opening 22 left in the wall of the article so molded by the core or mandrel upon which it is formed. This apparatus is illustrated more particularly in Figs. 4 and 5. 30 denotes a base or frame member having at one end an enlargement 41 supporting the outer member of the closing or sealing mold. Said outer member as shown comprises two separable plates or sections, 26 and 27, having in their adjacent faces cavities 29 which together form a space corresponding in size and shape to the exterior of that portion of the article in which the opening 22 left by the core is located. In the present instance the space or cavity 29 is of a suitable shape to form the usual perforated tab upon the bottom of the water bottle or bag. The plates 26 and 27 are positioned with respect to each other and to their support 41 by means of pins 28 passing through openings in said plates and support. 33 denotes the inner member of the closing and sealing mold. This member is preferably in the form of a bar shaped at its ends and on three of its lateral faces to correspond with the interior surface of the bottom of the finished bottle, the portion of said member lying adjacent to the opening 22 being of a greater area than that of the opening 22, so that said member may engage the interior surface of the wall of the bottle surrounding said opening and adjacent thereto. The mold member 33 is preferably made sufficiently small in transverse section to be removable through the neck 20 of the finished bottle. 31 denotes ears projecting from the base 30 near its end opposite the enlargement 41 and to which ears is loosely pivoted an arm 32 by means of a pin 34 connecting said ears and passing through a slot 330 in said arm. The arm 32 may be turned upon its pivot from the position shown in dotted lines in Fig. 5 into the position shown in full lines in said figure, said arm being preferably further located in the latter position by means of lugs 43 projecting from the base 30 and arranged on opposite sides of said arm. The end of the arm 32 opposite the pivot 34 is preferably reduced in size to enter a socket 39 formed in the rear face of the mold member 33. Loosely mounted on the arm 32 is a thimble or sleeve 35 having a threaded end adapted to coöperate with the thimble 18 in the neck of the bottle. Said sleeve 35 is limited as to its movement longitudinally of the arm 32 by a collar 340 fixed on said arm. 36 denotes a lug projecting from the base 30 beyond the ears 31 and having a threaded opening to receive a screw 37 adapted to engage the end of the arm 32 when the latter is in lowered position, said screw being turned by a hand wheel 38.

It will be observed that when the parts are in the position shown in Figs. 4 and 5 the inner and outer members 33 and 26—27 of the closing mold engage respectively the interior and exterior surfaces of the wall of the bottle adjacent the opening 22 so as to form therebetween a molding cavity a part of which coincides with said opening 22 and is surrounded by the edges thereof. In other words said molding cavity is formed when the unfinished bottle is in position in the closing mold by the mold members 26, 27 and 33 and the edges of the opening 22 in the wall of the bottle.

The operation of closing the opening in the bottle is as follows. The upper plate 26 of the outer mold member is removed and the arm 32 is swung into an upright position upon its pivot 34. The inner mold member 33 is then placed within the bottle in substantially the position shown, the arm 32 is inserted into the neck of the bottle and engaged in the socket 39, and the sleeve 35 is screwed into the thimble 18 to hold these parts in proper relative position. A piece of unvulcanized rubber of a size sufficient to fill the molding cavity above referred to is then inserted into the opening 22, the arm 32 is turned into a horizontal position, the upper plate 26 of the outer mold member is put into place, and may, if desired, be clamped to the base 41 by any suitable means (not shown), and the portion of the bottle or bag within the closing mold thereupon vulcanized in any suitable manner, thereby uniting the walls of the bottle and the finishing or sealing piece, inserted into the opening, 22, into a solid and integral structure. In order to force the inner mold member 33 into close engagement with the wall of the bottle and the latter into close engagement with the outer mold member the hand wheel 38 and screw 37 may be manipulated prior to or during the vulcanizing operation to move the arm 32 longitudinally, the slot 330 permitting such movement.

42 denotes openings in the inner mold member 33 to permit any surplus rubber to escape from the molding cavity during vulcanization.

Having thus described my invention, I claim:

1. An apparatus for closing openings in rubber water bottles and the like comprising a base, an outer mold member supported by said base, an arm pivoted to said base and adapted to enter the mouth of said bottle, and an inner mold member supported by said arm, said mold members being adapted to engage respectively the interior and exterior surfaces of the wall of said bottle adjacent said opening and said base and arm being arranged to hold said members in coöperative position to form therebetween a molding cavity substantially coincident with said opening.

2. An apparatus for finishing hollow plastic articles comprising inner and outer mold members adapted to engage respectively the interior and exterior surfaces of the wall of said article, means for supporting said outer mold member, an arm carried by said supporting means adapted to extend into said article and engage and support said inner mold member, and means for securing the walls of said article to said arm.

3. An apparatus for closing openings in rubber water bottles and the like comprising a base, an outer mold member supported by said base, an arm pivoted to said base and adapted to enter the mouth of said bottle, an inner mold member supported by said arm, said mold members being adapted to engage respectively the interior and exterior surfaces of the wall of said bottle adjacent said opening and said base and arm being arranged to hold said members in coöperative position to form a molding cavity therebetween substantially coincident with said opening, and a sleeve carried by said arm and adapted to engage the mouth of said bottle.

4. An apparatus for closing openings in rubber water bottles and the like comprising a base, an outer mold member supported by said base, an inner mold member, an arm by which said inner mold member is carried, said arm being adapted to enter the mouth of said bottle and having a slotted outer end, a pin carried by said base and entering the slot in said arm and a screw carried by said base and engaging the end of said arm.

5. An apparatus for closing openings in rubber water bottles and the like comprising a base, an outer mold member supported by said base, an arm pivoted to said base and adapted to enter the mouth of said bottle, an inner mold member supported by said arm, said mold members being adapted to engage respectively the interior and exterior surfaces of the walls of said bottle adjacent said opening and said base and arm being arranged to hold said members in coöperative position to form a molding cavity therebetween substantially coincident with said opening, said inner member being provided with an opening or openings for the escape of surplus material from said cavity.

In testimony whereof I affix my signature in presence of two witnesses.

JEREMIAH L. MAHONEY.

Witnesses:
WELLINGTON URE,
GEORGE R. COOLEY.

Copies of this patent may be obtained for five cents each, by addressing the "Commissioner of Patents, Washington, D. C."